United States Patent [19]
Braden, Jr.

[11] 3,854,532
[45] Dec. 17, 1974

[54] ENRICHED GAS DRIVE RECOVERY PROCESS

[75] Inventor: William B. Braden, Jr., Houston, Tex.

[73] Assignee: Texaco Inc., New York, N.Y.

[22] Filed: Oct. 6, 1972

[21] Appl. No.: 295,772

[52] U.S. Cl. .................................. 166/274, 166/273
[51] Int. Cl. ............................................. E21b 43/16
[58] Field of Search ............ 166/266, 273, 274, 275

[56] References Cited
UNITED STATES PATENTS

| | | | |
|---|---|---|---|
| 2,880,801 | 4/1959 | Crump | 166/266 |
| 3,096,821 | 7/1963 | Dyes | 166/273 |
| 3,126,951 | 3/1964 | Santourian | 166/274 |
| 3,134,433 | 5/1964 | Bocquet | 166/273 |
| 3,157,230 | 11/1964 | Connally et al. | 166/274 |
| 3,249,157 | 5/1966 | Brigham et al. | 166/273 |

Primary Examiner—Stephen J. Novosad
Assistant Examiner—Jack E. Ebel
Attorney, Agent, or Firm—Thomas H. Whaley; C. G. Ries

[57] ABSTRACT

A miscible flood process for the recovery of hydrocarbons from a hydrocarbon-bearing reservoir having a gas saturation is effected by the injection of a hydrocarbon solvent that is conditionally miscible with the reservoir hydrocarbon liquid and which is thereafter followed by a drive fluid to move the previously injected solvent thru the reservoir, thereby displacing the reservoir hydrocarbons to a production well from which they are produced.

18 Claims, 1 Drawing Figure

TERNARY DIAGRAM FOR THE SYSTEM:
    GAS (G)
    INTERMEDIATES $(C_2-C_4)(I)$
    PENTANES PLUS $(C_5+)(P)$
M-N (PHASE BOUNDARY CURVE AT REDUCED PRESSURE)
A-B (PHASE BOUNDARY CURVE AT BUBBLE POINT PRESSURE)

TERNARY DIAGRAM FOR THE SYSTEM:
  GAS (G)
    INTERMEDIATES $(C_2-C_4)$ (I)
    PENTANES PLUS $(C_5+)$ (P)
M-N (PHASE BOUNDARY CURVE AT REDUCED PRESSURE)
A-B (PHASE BOUNDARY CURVE AT BUBBLE POINT PRESSURE)
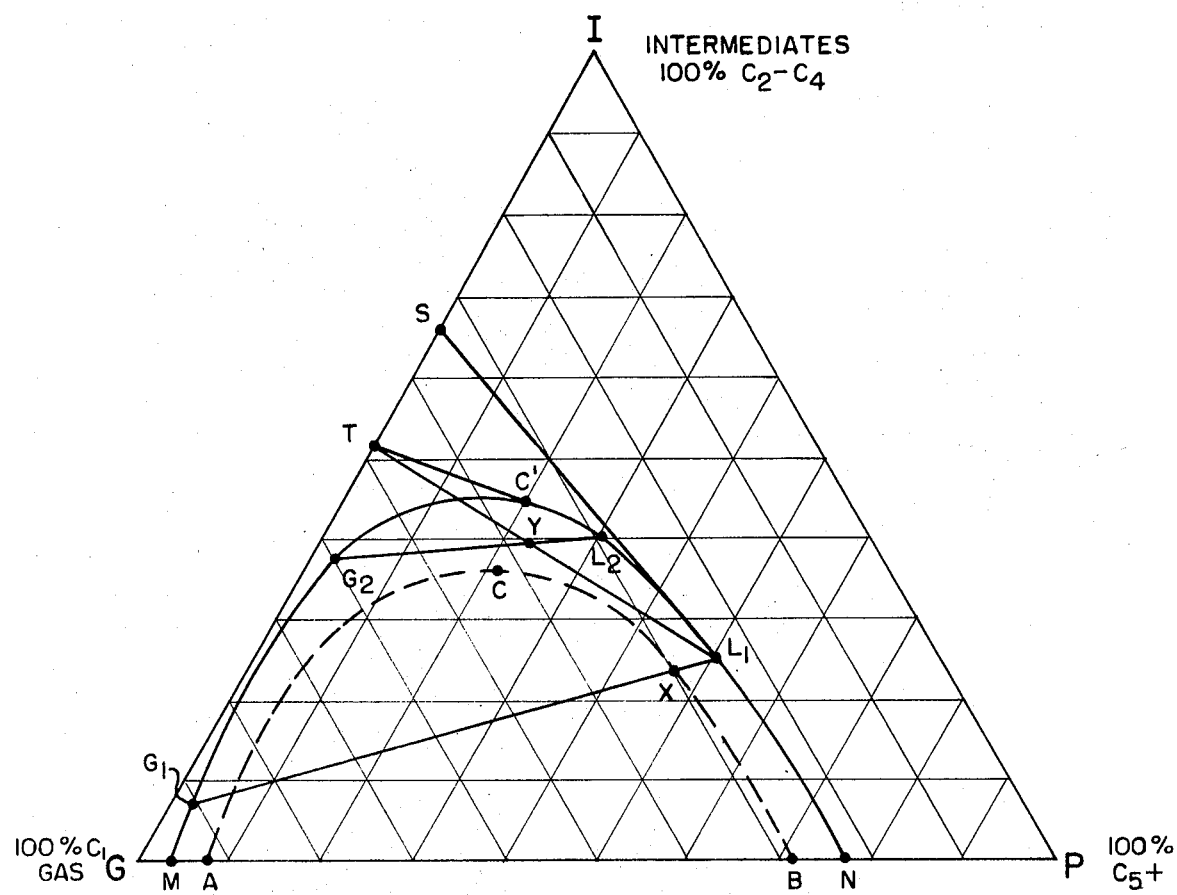

ENRICHED GAS DRIVE RECOVERY PROCESS

FIELD OF THE INVENTION

This invention relates to a process for the recovery of hydrocarbons from a subterranean hydrocarbon-bearing reservoir having a gas saturation, by injecting thereinto a conditionally miscible solvent. Thereafter, a drive fluid is injected to move the solvent thru the reservoir thereby displacing the reservoir hydrocarbons to a production well from which they are produced.

DESCRIPTION OF THE PRIOR ART

In the recovery of oil from an underground reservoir one method that has been suggested for improving oil recovery is that of miscible flooding wherein a solvent is injected into the reservoir to push and wash out the oil of the reservoir. When solvents are employed which can mix completely with the oil, the term "miscible flooding" is applied to the process.

The process of miscible flooding is very effective in stripping and displacing the reservoir oil from the reservoir thru which the solvent flows. This effectiveness is derived from the fact that a two-phase system within the reservoir and between the solvent and the reservoir fluid is eliminated at the conditions of temperature and pressure of the reservoir, thereby eliminating the retentive forces of capillarity and interfacial tension that are significant factors in reducing the recovery efficiency of oil in conventional flooding operations where the displacing agent and the reservoir oil exist as two phases in the reservoir.

One of the principal problems that occurs in the application of miscible flooding is how best to utilize the solvent injected, since the cost of the solvent may be comparable to the cost of the reservoir oil to be recovered. One technique that has been used is reclamation and recycling of the solvent as, for example, is done in the LPG recycling process.

Another technique that is used employs a slug of a solvent that is capable of mixing completely with the reservoir hydrocarbons, i.e., one which is miscible with the hydrocarbons and which is thereafter displaced thru the reservoir by a driving agent subsequently injected. Combinations of these two techniques are also used.

In another development of the miscible slug process a displacing agent or solvent may be used that is not miscible upon initial contact with the reservoir oil, but which becomes miscible with the reservoir oil by means of a process involving the preferential absorption by the reservoir oil of the intermediate components present in the displacing agent or solvent. This process, which leads to miscibility between the displacing agent and the oil as the oil becomes richer in the intermediates, is known as an enriched gas drive.

One of the principal means of primary production is the use of a solution gas drive whereby the reservoir is produced by a pressure depletion and a liquid expansion. As the pressure of the reservoir is reduced, a pressure is reached that is termed the saturation pressure or "bubble point pressure" at which point a gas saturation develops and two phases, gas and liquid, are created in the reservoir. Further production by pressure depletion results in an increasing gas saturation. Where the gas saturation increases to a point where the gas becomes a continuous phase, gas permeability is so high that little additional oil production is realized and thereafter, in order to obtain further production, it is necessary to employ some type of secondary recovery process. Pressure depletion of a reservoir after the bubble point pressure has been reached in the oil column may be continued until the gas saturation is about 30 percent of the hydrocarbon pore volume. By hydrocarbon pore volume is meant that fraction of the void volume or pore volume of the reservoir that contains fluid hydrocarbons.

Among the types of secondary processes that have been used following solution gas drive is the miscible slug process. In the application of a miscible flood to a reservoir having a gas saturation, that is, free gas existing in the oil column, a prepressuring of the reservoir to substantially eliminate the free gas phase is generally undertaken prior to the initiation of the miscible flood process.

Prior art also teaches the use of a miscible process in a reservoir having a gas saturation wherein the composition of the hydrocarbon solvent is miscible with both the gas and the liquid phases of the reservoir fluid.

I have found that a miscible recovery process may be successfully applied to a reservoir having a gas saturation, that is, a gas phase in the oil column, without prepressuring the reservoir and without requiring the injected solvent to be miscible with both the gas and the liquid phases.

SUMMARY OF THE INVENTION

This invention relates to a miscible flood process for the recovery of hydrocarbons from a subterranean hydrocarbon-bearing reservoir having a gas saturation where a displacing agent that is conditionally miscible with the reservoir hydrocarbon liquid is injected into the reservoir and which thereafter is displaced thru the reservoir by the injection of a drive fluid.

BRIEF DESCRIPTION OF THE FIGURE

The accompanying ternary diagram illustrates a three-component composition diagram for a complex hydrocarbon system, illustrative of this invention.

DESCRIPTION OF THE INVENTION

In its broadest aspect the invention relates to a miscible flood that can be applied to a subterranean hydrocarbon-bearing reservoir having a gas saturation, or to a reservoir that has been pressure depleted below its bubble point pressure. A solvent that is conditionally miscible with the liquid portion of the reservoir fluid is injected and is thereafter driven thru the reservoir by the injection of a drive fluid. By operating within the described manner which will become apparent from the following discussion, essentially complete displacement of the liquid hydrocarbon oil is obtained without the necessity to repressure the formation or to operate with a slug that is miscible with both the gas and the liquid phases.

Under a given set of conditions of temperature and pressure for a hydrocarbon-bearing reservoir there exists a mixture of hydrocarbons having a composition such that, when contacted with the reservoir liquid hydrocarbons at the temperature and pressure of the reservoir the mixture of hydrocarbons, will form a conditionally miscible zone with the hydrocarbon liquid wherein no discernible phase change exists. When this occurs the forces of capillarity and interfacial tension associated with the oil-bearing reservoir are reduced to zero, thereby releasing the hydrocarbon liquid in the matrices of the reservoir to the mixture of the single fluid phase.

Conditional miscibility is to be distinguished from instant or first contact miscibility by the fact that miscibility in a conditional miscibility sense is achieved by a series of multiple contacts wherein components of the injected solvent are absorbed in the oil, thereby creating a miscible transition zone in situ by an enriched gas drive.

The phenomenon of conditional miscibility can be demonstrated by referring to the accompanying FIGURE. It should be pointed out that although the depiction of a complex hydrocarbon system such as is found in an oil-bearing reservoir is somewhat arbitrary, the graphical representation as seen in the accompanying FIGURE is useful in explaining qualitatively the events that occur within the reservoir during the practice of this invention.

In the three-component composition diagram, often referred to as a ternary diagram, the three components are: (G) a gas ($C_1$), (I) intermediates ($C_2$–$C_4$), (P) pentanes plus ($C_5+$) and are represented by the vertices of the triangle. The phase relations among the three components are depicted thereon for a given temperature and two pressures.

The sides of the triangle represent mixtures of the components connecting the respective vertices of the triangle and may be referred to as pseudo-binary mixtures. The composition of the components contained in the pseudo-binary mixtures is given by the scale along the sides of the triangle and is in mol percent. A point within the triangle represents a composition containing all three components and its composition is determined by the appropriate mol percent values at the intersection of the point. Such a composition within the triangle may be homogeneous in one phase or heterogeneous in two phases.

The dotted curve, A, C, B represents the phase envelope curve at the existing temperature and at the saturation or bubble point pressure of the reservoir. In the area within this phase envelope two phases exist in equilibrium, viz., gas and liquid, whereas outside this envelope only one phase exists. Point X represents a given composition of a reservoir fluid at the saturation or bubble point pressure. The bubble point pressure is defined as the minimum pressure at which the first bubble of free gas appears in the hydrocarbon liquid and comes out of solution. If the pressure on the reservoir is reduced, the phase envelope will increase in area. This situation is depicted by curve M, C', N.

For a given reservoir having a hydrocarbon composition X as shown in the FIGURE, at the original pressure of the reservoir, or at the bubble point pressure, the reservoir fluids exist as a single phase. Upon pressure reduction, two phases will appear, namely liquid $L_1$ and gas $G_1$, which phases are in equilibrium with each other. If a solvent represented by S is injected that displaces gas $G_1$ and contacts liquid $L_1$, the resulting composition will lie along the line connecting $L_1$ and S. This line tangent to $L_1$ and intersecting the left side of the triangle at S represents the composition of solvent having the minimum concentration of intermediates that would have first contact miscibility with the liquid $L_1$. Compositions of solvent having a lower concentration of the intermediates would normally have conditional miscibility with the liquid $L_1$. The concept of conditional miscibility which is the essence of this invention can be shown by referring to the accompanying FIGURE and point T which lies on the tangent to the critical point on the phase boundary curve at the lower pressure shown by line T, C'. A solvent having the composition represented by T, when injected into the reservoir and on contact with $L_1$, will result in a fluid having a composition as shown by way of example at Y on the ternary diagram.

The resultant mixture Y consists of two phases, namely liquid $L_2$ and gas $G_2$, which phases are in equilibrium with each other. In like manner a new volume of solvent T would displace gas $G_2$ and contact liquid $L_2$, and so on until the composition of the equilibrium liquid would have proceeded to a point on the phase boundary curve such that solvent T and the reservoir liquid are miscible in all proportions. Any solvent composition lying between T and S will represent a solvent that is conditionally miscible with the liquid phase of the reservoir hydrocarbon and is within the scope of this invention.

In the process of the invention, the minimum composition, such as represented by T, whereby conditional miscibility can occur, may be determined by slim tube displacement tests or glass windowed cell PVT tests or displacement-from-core tests. These types of tests have been described in literature.

Illustrative of the present invention, a core 11.2 cm. long and 8.8 cm. in diameter having a porosity of 14.8 percent and a permeability of 197 millidarcies, was mounted in a high pressure cell, and two displacement-from-core tests were performed.

In the first test the core was saturated with a mixture having a composition of 44.0 percent methane and 56.0 percent n-decane. The mixture had a bubble point of 2085 psia at 160° F. The core was first produced by solution gas drive whereby the pressure was depleted to 1,955 psia at 160° F. establishing approximately a 5 percent gas saturation by volume in the core. A displacing fluid having a composition of 52.5 percent methane and 47.5 percent n-butane was then injected and displacement was conducted at a frontal velocity of 0.0498 ft./day. The mixture which was liquid at the conditions of the test, i.e., on isothermal expansion the mixture exhibited a bubble point, was not miscible in all proportions with the in-place liquid at the core conditions and its composition lay above the tangent to the critical shown by way of illustration as line T–C' in the FIGURE, and in the region between T and S.

A second test was conducted under conditions of first contact miscibility for comparison. The core was saturated with a mixture having a composition of 43.2 percent methane and 56.8 percent n-decane. This mixture had a bubble point of 2,050 psia at 160° F. The fluid in the core was then displaced downward at 2,130 psia and 160° F. with pure n-butane at a frontal velocity of 0.0475 ft./day. The ratio of the frontal to critical velocity was 0.0303, hence viscous fingering was believed not to have occurred. This displacement was conducted under conditions that were miscible throughout, i.e., the admixture of the fluids yielded a single phase fluid in all proportions.

A comparison of the recovery from the two tests is given in the following table. The results show that recovery from a core having a gas saturation by displacement under conditions of conditional miscibility, was almost identical to recovery from a core in which the displacement was conducted above the bubble point pressure.

CUMULATIVE RECOVERY VERSUS INJECTED PORE VOLUMES OF DISPLACING FLUID

PERCENT RECOVERY

| Pore Volumes Injected | Test No. 1 (Gas Saturation in Core) | Test No. 2 (Displacement above the Bubble Point pressure) |
|---|---|---|
| 0.4 | 41 | 39 |
| 0.8 | 78 | 74 |
| 1.0 | 87 | 85 |
| 2.0 | 96 | 97 |
| 3.0 | 97 | 99 |

Thus, the results which demonstrate the invention, show that comparable recovery can be achieved using a significantly leaner solvent as the displacing fluid that is not miscible with the in-place fluid on first contact. Furthermore, the in-place fluid need not be a single phase liquid, but can have a free gas saturation, thereby eliminating the requirement to repressure the formation to a single phase fluid.

Upon the establishment of a miscible zone, essentially complete displacement of the liquid will occur. The solvent is injected in an amount sufficient to establish a conditional miscible transition zone with the reservoir equilibrium liquid. Generally, the amount of solvent injected is in the range of 1 to 30 percent hydrocarbon pore volume. In some cases, higher volume percentages may be employed.

While the solvent is usually injected alone, in instances where improved mobility control is sought, water or brine, either thickened or unthickened, may be injected simultaneously or alternately with the solvent. The use of thickeners such as polyacrylamides to increase the viscosity of aqueous liquids thereby improving mobility control is well-known in the art.

The solvent may be any hydrocarbon having from 2 to 6 carbon atoms in the molecule or mixtures thereof. The solvent may also comprise a mixture of methane or natural gas and at least one hydrocarbon having from 2 to 6 carbon atoms per molecule. In addition, the solvent may also contain other constituents such as carbon dioxide, hydrogen sulfide, sulfur dioxide, separator gas and mixtures thereof. The solvent, in short, may have any composition provided that the solvent have the requisite capability of being conditionally miscible with the reservoir hydrocarbon liquid. Separator gas as defined herein, means a gas that is generally mostly methane with some $C_2+$ present depending on separator conditions.

After a sufficient quantity of solvent has been injected, a drive fluid is normally injected. The drive fluid may be a drive gas such as methane, natural gas, carbon dioxide, nitrogen, air, flue gas or mixtures thereof. The drive fluid may also be water, either thickened or unthickened, to improve the mobility ratio. The drive fluid may also be a mixture of air and water or gas and water, injected simultaneously or alternately so as to improve sweep efficiency. The drive fluid may have miscibility with the trailing edge of the solvent slug, although trailing edge miscibility is not a limitation on this invention.

It is within the scope of the invention to apply the process either as a horizontal displacement technique wherein the slug of the hydrocarbon solvent is established to form a circumferential ring expanding outwardly from the injection well as the process is continued, or it can be used in a vertical displacement wherein a blanket of the solvent is established and displaced downward by a fluid. In addition, the process may also be employed in dipping reservoirs, wherein displacement in the reservoir is downward along the strike of the reservoir.

I claim:

1. A process for recovering hydrocarbons from a hydrocarbon-bearing reservoir having a hydrocarbon liquid phase and a gas saturation, traversed by at least one injection well and one production well, comprising the steps of:
   a. determining the composition of a hydrocarbon solvent that is conditionally miscible with said liquid phase at the temperature and pressure of said reservoir,
   b. injecting into said reservoir via said injection well a slug of said hydrocarbon solvent in an amount sufficient to establish a miscible transition zone of said slug with said hydrocarbon liquid phase,
   c. injecting into said reservoir a drive fluid at a pressure and in an amount sufficient to maintain a drive of said slug and said reservoir hydrocarbons toward said production well and,
   d. recovering said hydrocarbons via said production well.

2. The process of claim 1 wherein said hydrocarbon solvent comprises a mixture of methane and at least one hydrocarbon having from 2 to 6 carbon atoms per molecule.

3. The process of claim 1 wherein said hydrocarbon solvent contains methane, natural gas, carbon dioxide, hydrogen sulfide, sulfur dioxide, separator gas and mixtures thereof.

4. The process of claim 1 wherein water, brine, thickened water, thickened brine and mixtures thereof are injected simultaneously or alternately with said hydrocarbon solvent.

5. The process of claim 1 wherein said drive fluid is selected from the group consisting of methane, natural gas, carbon dioxide, nitrogen, air, flue gas and mixtures thereof.

6. The process of claim 1 wherein said drive fluid is water, brine, thickened water, thickened brine and mixtures thereof.

7. The process of claim 1 wherein said drive fluid is a gas and water injected as a mixture.

8. The process of claim 1 wherein said drive fluid is a gas and water, said gas and water being injected alternately.

9. The process of claim 1 wherein step (a) is preceded by pressure depletion to a pressure less than the reservoir bubble point pressure.

10. A process for recovering hydrocarbons from a hydrocarbon-bearing reservoir, said reservoir being traversed by at least one injection well and one production well, comprising the steps of:
    a. producing said reservoir by pressure depletion to a pressure at which a gas saturation and a hydrocarbon liquid phase are established in said reservoir, b. determining the composition of a hydrocarbon solvent that is conditionally miscible with said liquid phase at the temperature and pressure of said reservoir,
c. injecting into said reservoir via said injection well a slug of said hydrocarbon solvent in an amount sufficient to establish a transition zone of said slug with said liquid phase,
d. injecting into said reservoir a drive fluid at a pressure and in an amount sufficient to maintain a drive of said slug and said reservoir hydrocarbons toward said production well and,
e. recovery of said hydrocarbons via said production well.

11. The process of claim 10 wherein said pressure depletion is continued to a pressure in the range of from the bubble point pressure to a pressure at which the gas saturation is about 30 percent of the hydrocarbon pore volume.

12. The process of claim 10 wherein said hydrocarbon solvent comprises a mixture of methane and at least one hydrocarbon having from 2 to 6 carbon atoms per molecule.

13. The process of claim 10 wherein said hydrocarbon solvent contains methane, natural gas, carbon dioxide, hydrogen sulfide, sulfur dioxide, separator gas and mixtures thereof.

14. The process of claim 10 wherein water, brine, thickened water, thickened brine and mixtures thereof are injected simultaneously or alternately with said hydrocarbon solvent.

15. The process of claim 10 wherein said drive agent is selected from the group consisting of methane, natural gas, carbon dioxide, nitrogen, air, flue gas and mixtures thereof.

16. The process of claim 10 wherein said drive fluid is water, brine, thickened water, thickened brine and mixtures thereof.

17. The process of claim 10 wherein said drive fluid is a gas and water, injected as a mixture.

18. The process of claim 10 wherein said drive fluid is a gas and water, said gas and water being injected alternately.

* * * * *